United States Patent

Knuniants et al.

[15] 3,682,917

[45] Aug. 8, 1972

[54] METHOD FOR PRODUCING 5-FLUOROURACIL

[72] Inventors: Ivan Ljudvigovich Knuniants, Kotelnicheskay naberezhnaya, 1/15, kv. 336; Lev Solomonovich German, Serpukhovskaya ulitsa, 31, korpus 9, kv. 303; Natalia Borisovna Kazmina, poselok Malaklovka Moskovskoi oblasti, ulitsa Tsvetnaya 5, all of Moscow, U.S.S.R.

[22] Filed: March 25, 1970

[21] Appl. No.: 22,705

[52] U.S. Cl. ................................. 260/260, 260/694
[51] Int. Cl. .......................................... C07d 51/30
[58] Field of Search ........................... 260/260, 694

[56] References Cited

UNITED STATES PATENTS

| | | | |
|---|---|---|---|
| 2,013,030 | 9/1935 | Calcott et al. | 260/694 |
| 2,186,917 | 1/1940 | Gaylor | 260/694 |

*Primary Examiner*—Alex Mazel
*Assistant Examiner*—Anne Marie T. Tighe
*Attorney*—Holman & Stern

[57] ABSTRACT

The present invention concerns the method for producing 5-fluorouracil. In accordance with the said method uracil is brought to interact with fluorine in diluent medium which partly or completely dissolves uracil without interacting with fluorine, in an atmosphere of inert gas with subsequent separation of the formed end product. It is preferable to employ acetic acid as diluent, and nitrogen as the inert gas. The end product 5-fluorouracil finds wide application in cancer therapy of the mammary gland and gastrointestinal tract.

It is also the initial product for the synthesis of 5-fluor-2'-desoxyuridine and N-2'-tetrahydrofuryl-5-fluorouracil which are also employed in medicine as antitumor agents. Besides the above, 5-fluorouracil finds application for biochemical investigations.

4 Claims, No Drawings

METHOD FOR PRODUCING 5-FLUOROURACIL

The present invention relates to improvements in the method for producing 5-fluorouracil which is an effective antimetabolite used as an agent for mammary gland and gastrointestinal cancer therapy. 5-fluorouracil is also the initial product in the synthesis of 5-fluor-2'-desoxyuridine and N-2'-tetrahydrofuryl-5-fluorouracil employed in medicine as antitumor preparations.

Besides the above, 5-fluorouracil is widely employed for biochemical investigations.

The known method for obtaining 5-fluorouracil consists in condensing ethylmonofluoroacetate with ethyl formate in the presence of potassium ethoxide with the formation of ethylformylfluoroacetate enolate, condensing the latter with alkylisothyuronium salt and subsequent hydrolysis of the product obtained. The yield of the end product constitutes 18–30 percent by weight based on initial ethyl monofluoroacetate. See U.S. Pat. No. 2,802,005, R. Duschinsky, E. Pleven, Ch. Heidelberger, J. Am. Chem. Soc. 79, 4559 /1957/ and I. Feldman et al., Med. Prom. SSSR, 19/3, 12/1965.

The drawbacks of the above mentioned method are the low yield of the end product and the multi-stage process.

The particular object of the present invention is to ensure a higher yield of the end product.

Another object of the present invention is to simplify the technology of the process employed.

This particular and other objects of the invention were attained by this method for producing 5-fluorouracil wherein, in accordance with this invention uracil is brought to interact with fluorine, in diluent medium, which partly or completely dissolves uracil, and does not interact with fluorine, in an inert gas atmosphere, with subsequent recovery of the formed end product.

As diluent it is advisable to use acetic acid or hydrogen fluoride as this serves to simplify the technology of separation and purification of the end product.

It is preferable to employ nitrogen as the inert gas.

With a view to increase the yield of the end product with acetic acid being used as diluent, it is advisable to carry out the process at 20°–25°C, whereas when anhydrous hydrogen fluoride is employed as diluent it is advisable to carry out the process within 0°–+5°C.

The present invention may be realized as follows.

Uracil is mixed with the diluent which may be, for example, acetic acid, hydrogen fluoride, sulphuric acid, water etc. It is advisable to carry out the process in acetic acid or hydrogen fluoride media. Then fluorine with inert gas, nitrogen for example, is introduced into the reaction mixture.

The temperature at which the process is carried out is determined by the selected diluent. The end of the reaction is determined by the disappearance of the initial uracil in the reaction mixture. Control is carried out by method of thin layer chromatography on aluminium oxide II stage activity acetone-water system = 1:7.

At the end of the reaction the diluent is distilled off and the residue washed with ethyl ether, for example, then, if acetic acid was employed as diluent, it is crystallized from water.

The yield of the end product is 52–55 percent by weight of theory, based on uracil. When hydrogen fluoride is employed as diluent the residue, after the diluent is distilled off, is treated with alkali, the solution is filtered, the filtrate is acidified by concentrated hydrochloric acid, cooled, the deposit is separated, washed in ether, dried, and then crystallized from water.

The yield of the end product is 6–8 percent by weight of theory, based on uracil. The method offered by this invention permits to increase the yield of the end product, to simplify the technology of the process i.e. the process is carried out in one stage and permits the exclusion of the use of a highly toxic initial product—ethyl monofluoroacetate.

For a better understanding of the invention the following examples are given by way of illustration of the method.

EXAMPLE 1

Through a vigorously stirred suspension consisting of 2 g 0.018 mole uracil in 170 cc acetic acid a mixture of $F_2$ and $N_2$ is passed for 12–15 hours. $F_2$ and $N_2$ are taken in voluminal ratio of 1:5 at a temperature of 20°C, and at a speed of 200–300 cc per hr.

The end of the reaction is determined by the disappearance of initial uracil in the reaction mixture thin layer chromatography method on $Al_2O_3$, 11 stage activity acetone—water system = 1:7.

The reaction mixture is concentrated by evaporation in vacuum, the residue is subjected to manifold washing with etrer, crystallized from water with activated coal and dried in vacuum over $P_2O_5$ at 100°C.

The yield is 1.2g 52 percent of theory, based on uracil 5-fluorouracil, melting point 282°–283° with decomposition, the temperature corrected. The melting point of the mixed sample with previously known 5-fluorouracil, obtained according to the known method showed no depression, melting point 282°–283° with decomposition, the temperature corrected.

The infra-red spectrum of the sample obtained is completely identical to the infra-red spectrum of the previously known compound: 760 weak; 820 medium; 890 weak; 950 weak; 1,000 weak; 1,180 weak; 1,220 weak; 1,250 strong; 1,350 weak; 1,430 medium; 1,510 weak; 1,670 strong; 1,730 weak; 2,000 weak; wide band 2,800–3,600 $cm^{-1}$. Ultra-violet spectrum: 265–266 0.1 N HCl.

Data cited by literary sources: melting point 282°–283° with decomposition. Ultra-violet spectrum: 265–266 0.1 N HCl.

EXAMPLE 2

A mixture of fluorine and nitrogen taken in a ratio of 1:4 by volume is passed at vigorous stirring for a period of 7 hours through a solution of 2.8 g 0.025 mole uracil in 150 cc anhydrous hydrogen fluoride at 0°–+5°C.

The process is continued until the initial uracil in reaction mixture disappears. On completion of the reaction the hydrogen fluoride is distilled off at 0°C in a current of $CO_2$, the residue is dissolved in aqueous KOH, the solution is filtered, the filtrate is then acidified by concentrated hydrochloric acid up to pH 2 and cooled. The crystalline precipitate is separated, washed with ether, dried and crystallized from water to obtain 0.2 g—6.1 percent of theory—5-fluorouracil which is identical to that described in example 1 i.e., by melting point, infra-red spectrum.

We claim:

1. A method for producing 5-fluorouracil comprising reacting uracil with fluorine in acetic acid at a temperature from about 20° to about 25°C in an inert gas atmosphere.

2. The method of claim 1 wherein said inert gas is nitrogen.

3. A method for producing 5-fluorouracil comprising reacting uracil with fluorine in hydrogen fluoride at a temperature of from about 0° to about 5°C in an inert gas atmosphere.

4. The method of claim 3 wherein said inert gas is nitrogen.

* * * * *